June 5, 1923.
J. R. KIDNEY
BICYCLE BELL
Filed April 4, 1923
1,457,705
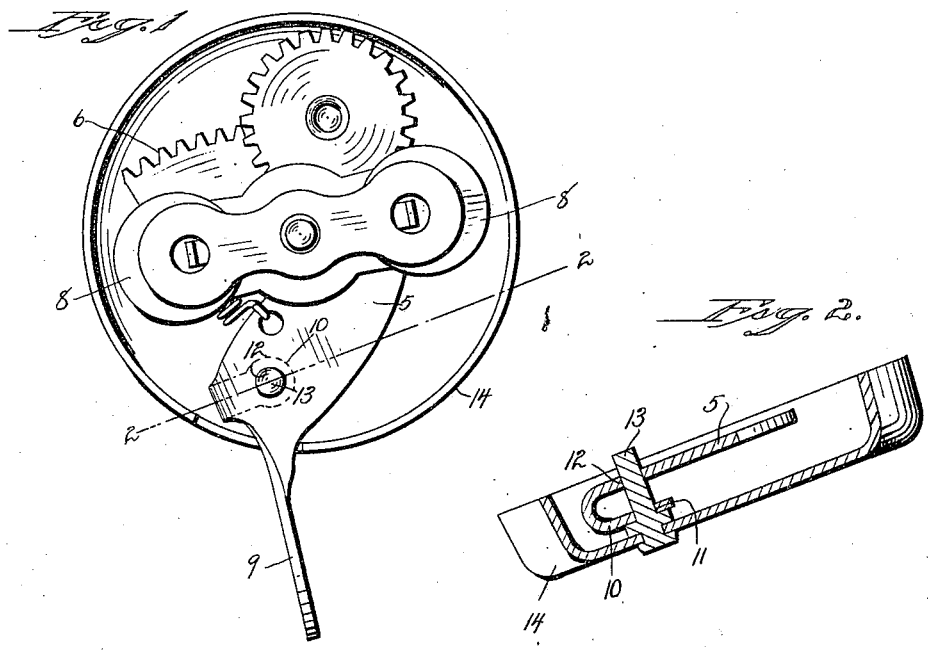
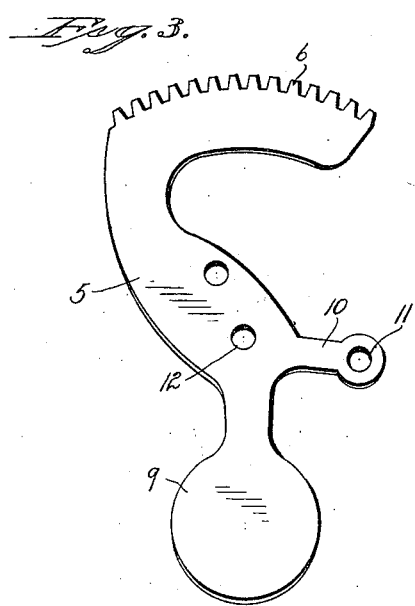
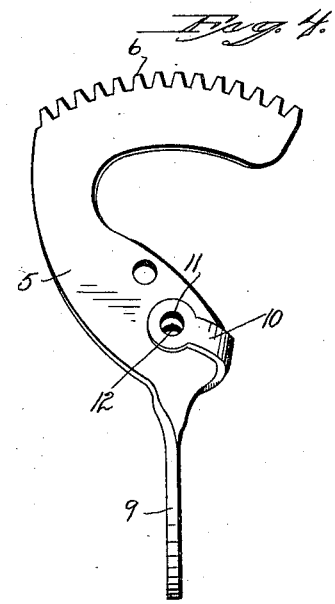
Inventor
Josiah R Kidney
by Seymour & Earle
Atty Patented June 5, 1923.

1,457,705

UNITED STATES PATENT OFFICE.

JOSIAH R. KIDNEY, OF EAST HAMPTON, CONNECTICUT, ASSIGNOR TO THE N. N. HILL BRASS CO., OF EAST HAMPTON, CONNECTICUT, A CORPORATION.

BICYCLE BELL.

Application filed April 4, 1923. Serial No. 629,838.

*To all whom it may concern:*

Be it known that I, JOSIAH R. KIDNEY, a citizen of the United States, residing at East Hampton, in the county of Middlesex and State of Connecticut, have invented a new and useful Improvement in Bicycle Bells; and I do hereby declare the following, when taken in connection with the accompanying drawings and the characters of reference marked thereon, to be a full, clear, and exact description of the same, and which said drawings constitute part of this application, and represent, in—

Fig. 1 a plan view of a bicycle bell with the gong removed.

Fig. 2 a sectional view on the line 2—2 of Fig. 1.

Fig. 3 a detached perspective view of a lever as it is struck from sheet-metal.

Fig. 4 a detached perspective view of a completed lever.

This invention relates to improvements in bicycle bells, and particularly to bicycle bells in which a double-ended hammer is rotated by means of a lever having a segmental rack. These levers are struck up from comparatively thin sheet-metal, and to form a proper bearing for them, they have been provided with a bushing adapted to set over a post in the bell-frame. The formation of these bushings and their application to the lever have been somewhat expensive.

The object of this invention is to form a lever so that a bushing will not be required, and the invention consists in a bicycle bell having certain details of construction and combinations of parts as will be hereinafter described and particularly recited in the claim.

In carrying out my invention, I form a lever 5 from sheet-metal of substantially the usual shape, comprising a segmental rack 6 adapted to drive a pinion 7 by which the hammers 8 are rotated, and the lever is also formed with the usual finger-piece 9. At one side of the lever, I form an integral arm 10, which is adapted to be folded over the face of the lever and parallel therewith, and this arm is formed with a perforation 11 registering with the perforation 12, which permits the lever to be set over a post 13 mounted in the base 14 of the bell.

By thus providing the lever with two spaced bearings, it is held against tilting in the same manner as though a long bushing were employed, and without the expense of forming the bushings and applying them to the levers.

I claim:

A bicycle bell, comprising a frame, a vertically-arranged post mounted therein, a rotary hammer, a pinion adapted to rotate said hammer, and a lever formed with a rack meshing with said pinion and with an integral arm turned over one face of the lever and parallel therewith, said arm and lever formed with perforations adapting the lever to set over said post.

In testimony whereof, I have signed this specification in the presence of two subscribing witnesses.

JOSIAH R. KIDNEY.

Witnesses:
 NORMAN N. HILL,
 NORMAN W. HILL.